(12) United States Patent
Noble (10) Patent No.: US 11,431,889 B2
(45) Date of Patent: Aug. 30, 2022

(54) HIGH PERFORMANCE IMAGING SYSTEM USING A DIELECTRIC METASURFACE

(71) Applicant: SEEING MACHINES LIMITED, Fyshwick (AU)

(72) Inventor: John Noble, Braddon (AU)

(73) Assignee: SEEING MACHINES LIMITED, Fyshwick (AU)

( * ) Notice: Subject to any disclaimer, the term of this patent is extended or adjusted under 35 U.S.C. 154(b) by 93 days.

(21) Appl. No.: 16/772,861

(22) PCT Filed: Dec. 7, 2018

(86) PCT No.: PCT/AU2018/051314
§ 371 (c)(1),
(2) Date: Jun. 15, 2020

(87) PCT Pub. No.: WO2019/119025
PCT Pub. Date: Jun. 27, 2019

(65) Prior Publication Data
US 2021/0176403 A1    Jun. 10, 2021

(30) Foreign Application Priority Data

Dec. 18, 2017   (AU) ............................... 2017905047

(51) Int. Cl.
*H04N 5/232* (2006.01)
*G01B 11/22* (2006.01)
(Continued)

(52) U.S. Cl.
CPC ....... *H04N 5/232125* (2018.08); *G01B 11/22* (2013.01); *G01B 11/25* (2013.01); *H04N 5/2259* (2013.01)

(58) Field of Classification Search
None
See application file for complete search history.

(56) References Cited

U.S. PATENT DOCUMENTS 10,699,429 B2 *   6/2020   Liu ......................... G06T 7/521
10,705,406 B2 *   7/2020   Kim ....................... G02F 1/292
(Continued)

FOREIGN PATENT DOCUMENTS

CN   211426796 U   *   9/2020   ............. G01S 17/08

OTHER PUBLICATIONS

Amir et al. , "Dielectric metasurfaces for complete control of phase and polarization with subwavelength spatial resolution and high transmission.", Nature nanotechnology 10.11 (2015): 937.
(Continued)

*Primary Examiner* — Cynthia Segura
(74) *Attorney, Agent, or Firm* — Jason P. Mueller; FisherBroyles, LLP (57) ABSTRACT

Described herein is an imaging system (200) for a driver monitoring system (100). The imaging system (200) includes a light source (108) for generating an input light beam (202) and projecting the input light beam (202) along a path towards a driver (102) of a vehicle. System (200) also includes a dielectric metasurface (201) positioned within the path of the input light beam (202). The metasurface (201) has a two dimensional array of surface elements configured to impose predetermined phase, polarization and/or intensity changes to the input light beam (202) to generate an output light beam (204) for illuminating the driver (102). System (200) further includes an image sensor (106) configured to image reflected light (208) being light from the output light beam (204) that is reflected from the driver.

20 Claims, 9 Drawing Sheets

(51) Int. Cl.
*G01B 11/25* (2006.01)
*H04N 5/225* (2006.01)

(56) References Cited

U.S. PATENT DOCUMENTS

| | | | |
|---|---|---|---|
| 2013/0208332 A1 | 8/2013 | Yu et al. | |
| 2014/0022348 A1* | 1/2014 | Shpunt | G01B 11/2527 348/46 |
| 2017/0125911 A1* | 5/2017 | Alu | H04R 23/00 |
| 2017/0287151 A1* | 10/2017 | Han | G02B 1/002 |
| 2018/0129866 A1* | 5/2018 | Hicks | H01S 5/18386 |
| 2018/0292644 A1* | 10/2018 | Kamali | G02B 5/0268 |
| 2019/0018137 A1* | 1/2019 | Akkaya | G02B 26/0808 |
| 2020/0051263 A1 | 2/2020 | Han et al. | |
| 2020/0249429 A1* | 8/2020 | Han | G02B 13/18 |
| 2021/0108964 A1* | 4/2021 | Shaltout | G01J 3/0256 |
| 2021/0190593 A1* | 6/2021 | Yao | G02B 5/3083 |
| 2021/0215991 A1* | 7/2021 | Tu | H01Q 3/44 |

OTHER PUBLICATIONS

Wang et al., "Spin-selected focusing and imaging based on metasurface lens", Optics express 23 20 (2015): 26434-26441.

\* cited by examiner

HIGH PERFORMANCE IMAGING SYSTEM USING A DIELECTRIC METASURFACE

This application is a national stage entry under 35 U.S.C. 371 of PCT Patent Application No. PCT/AU2018/051314, filed Dec. 7, 2018, which claims priority to Australia Patent Application No. 2017905047, filed Dec. 18, 2017, the entire contents of each of which is incorporated herein by reference.

FIELD OF THE INVENTION

The present invention relates to illumination and imaging systems. While some embodiments will be described herein with particular reference to the application of a driver monitoring system for imaging a driver of a vehicle, it will be appreciated that the invention is not limited to such a field of use, and is applicable in broader contexts. By way of example, embodiments of the invention have applications in illumination and imaging systems for mobile phones, webcams and LIDAR systems.

BACKGROUND

Any discussion of the background art throughout the specification should in no way be considered as an admission that such art is widely known or forms part of common general knowledge in the field.

To reduce distractions to drivers, driver monitoring systems typically rely on illumination and imaging of a driver outside the visible range and often in the near infrared (NIR) wavelength range. NIR illumination and imaging techniques are also employed in other systems such as mobile phones, webcams and LIDAR systems. However, NIR image sensors are largely insensitive to wavelengths outside a narrow operating range. As such, the image sensor is not able to capture light that is only slightly outside the narrow operating range. Thus, in NIR image sensors, it is important to maximize the amount of light that is projected into the field of view of the image sensor to increase the overall image intensity. Unfortunately, in many current imaging systems, up to 50% of light can be incident outside the field of view of the image sensors and hence is wasted. This wastage results in a reduced overall image quality. In the case of facial image tracking in driver monitoring systems, the reduced image quality can result in increased tracking errors and uncertainty.

Driver monitoring systems require depth information to accurately track facial features in three dimensions and to estimate head pose and eye gaze. Conventionally this depth information is obtained by imaging the driver with a stereo camera system that is accurately calibrated to the scene or using a three dimensional imaging sensor. However, these systems require expensive hardware. An alternative method is to impose a known structure onto the projected light and extrapolate depth information from the deformation of that structure upon reflection from the scene. However, current techniques for implementing structured light require the addition of a diffractive optical element into the optical train. This adds to the size and cost of the system, and adds to the overall optical loss experienced by light passing along the optical train.

Driver monitoring systems are known to suffer from issues associated with glare. In particular, in systems that employ active light illumination, glare from that light can be captured by the camera, thereby reducing the signal to noise ratio of the images. By way of example, when an illuminated subject is wearing corrective lens eye glasses or sunglasses, the geometry (e.g., convex shape) of the glasses may reflect the light illuminated onto the image that is acquired by the imaging camera. This reflection of the illumination source is generally seen as a glare on the subject's glasses. The resultant glare may occur at the regions of interest near the eye(s) of the subject, thus inhibiting the ability to recognize imaged facial characteristics of the eyes, face, and head. Typical glare reduction techniques involve strobing different light sources and performing post processing on the images to reduce glare. This necessarily adds to the computational complexity of the overall system.

The inventor has identified a desire for improvements in the above areas of driver monitoring systems and other illumination and imaging systems.

SUMMARY OF THE INVENTION

In accordance with a first aspect of the present invention there is provided an imaging system for a driver monitoring system, the imaging system including:
  a light source for generating an input light beam and projecting the input light beam along a path towards a driver of a vehicle;
  a dielectric metasurface positioned within the path of the input light beam, the metasurface having a two dimensional array of surface elements configured to impose predetermined phase, polarization and/or intensity changes to the input light beam to generate an output light beam for illuminating the driver; and an image sensor configured to image reflected light being light from the output light beam that is reflected from the driver.

In some embodiments, the array of surface elements has phase properties to produce a two dimensional structured light pattern across the output light beam. In some embodiments, the structured light pattern includes a plurality of dots disposed at known locations across the output light beam. In some embodiments, the dots are defined as regions of lower contrast than the surrounding output light beam. Preferably, the contrast ratio of the dots to the surrounding output light beam is in the range of 70% to 90%.

In some embodiments, the array of surface elements have polarizing properties to polarize the output light beam into a first polarization state corresponding to a left hand or right hand circular polarization. In these embodiments, the system includes a polarization filter disposed proximal to the image sensor, the filter configured to direct reflected light having the first polarization state to the image sensor and to reject light having all other polarization states. In one embodiment, the polarization filter includes a dielectric metasurface having a two dimensional array of surface elements configured to absorb the first circular polarized light component and pass the remaining reflected light.

In some embodiments, the array of surface elements has phase properties to shape the output light beam to substantially match a field of view of the image sensor.

In some embodiments, the light source is a laser. Preferably, the laser is a vertical-cavity surface emitting (VCSEL) laser.

In various embodiments, the imaging system is configured for operation in a driver monitoring system for monitoring a vehicle driver, in a mobile device for imaging a user of the device, in a LIDAR system or in a computer webcam for imaging a user of the computer.

In accordance with a second aspect of the present invention there is provided an imaging system for imaging a scene, the imaging system including:
- a light source for generating an input light beam and projecting the input light beam along a path towards the scene;
- a dielectric metasurface positioned within the path of the input light beam, the metasurface having a two dimensional array of surface elements configured to circularly polarize the input light beam to generate an output light beam having a circular polarization state for illuminating the scene;
- a polarization filter configured to receive reflected light from the scene and to direct reflected light having the circular polarization state to the image sensor and to reject light having all other polarization states; and
- an image sensor configured to image the reflected light to obtain images of the scene.

In accordance with a third aspect of the present invention there is provided an imaging system for imaging a scene, the imaging system including:
- a light source for generating an input light beam and projecting the input light beam along a path towards the scene;
- a dielectric metasurface positioned within the path of the input light beam, the metasurface having a two dimensional array of surface elements configured to produce a two dimensional structured light pattern across the beam to generate a structured output light beam for illuminating the scene;
- an image sensor configured to capture images of reflected light being light from the structured output light beam that is reflected from the scene; and
- a processor configured to process the captured images to estimate depth information about the scene from changes in the two dimensional structured light pattern.

BRIEF DESCRIPTION OF THE DRAWINGS

Preferred embodiments of the disclosure will now be described, by way of example only, with reference to the accompanying drawings in which.

DETAILED DESCRIPTION

System Overview

Described herein are embodiments of imaging systems for imaging a scene with a camera under active illumination from a light source. The preferred embodiments of the invention have been particularly developed for driver monitoring systems for imaging a driver of a vehicle. However, it will be appreciated that the invention is applicable to other fields of use and in other contexts in which the scene being imaged is not a driver of a vehicle. By way of example, embodiments of the invention have applications in illumination and imaging systems for mobile devices (mobile phones, tablet computers, PDAs laptops etc.), webcams and LIDAR systems.

Figure 1:
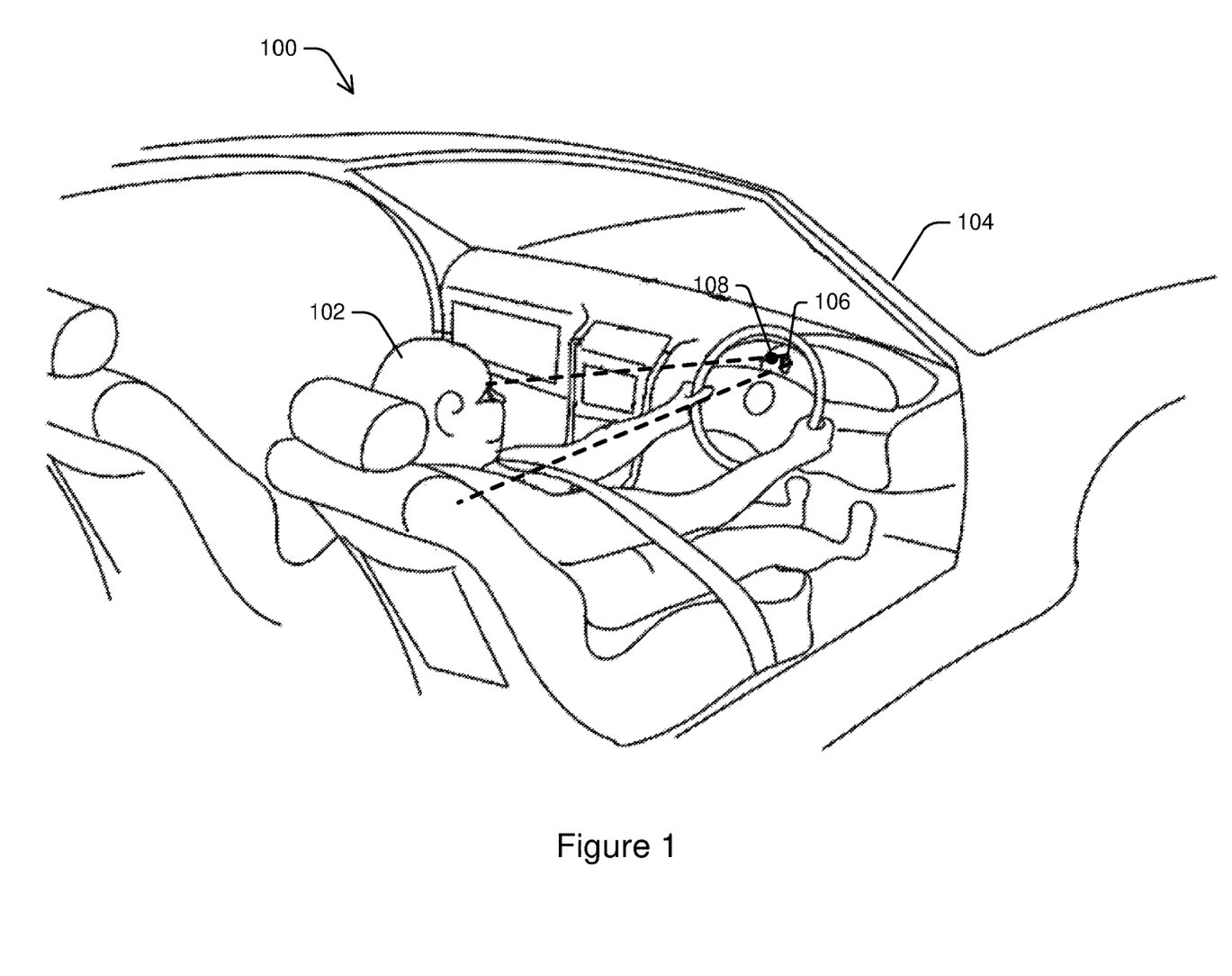
FIG. 1 is a perspective view of an interior of a vehicle illustrating a driver monitoring system according to an embodiment of the invention.
Figure 2:
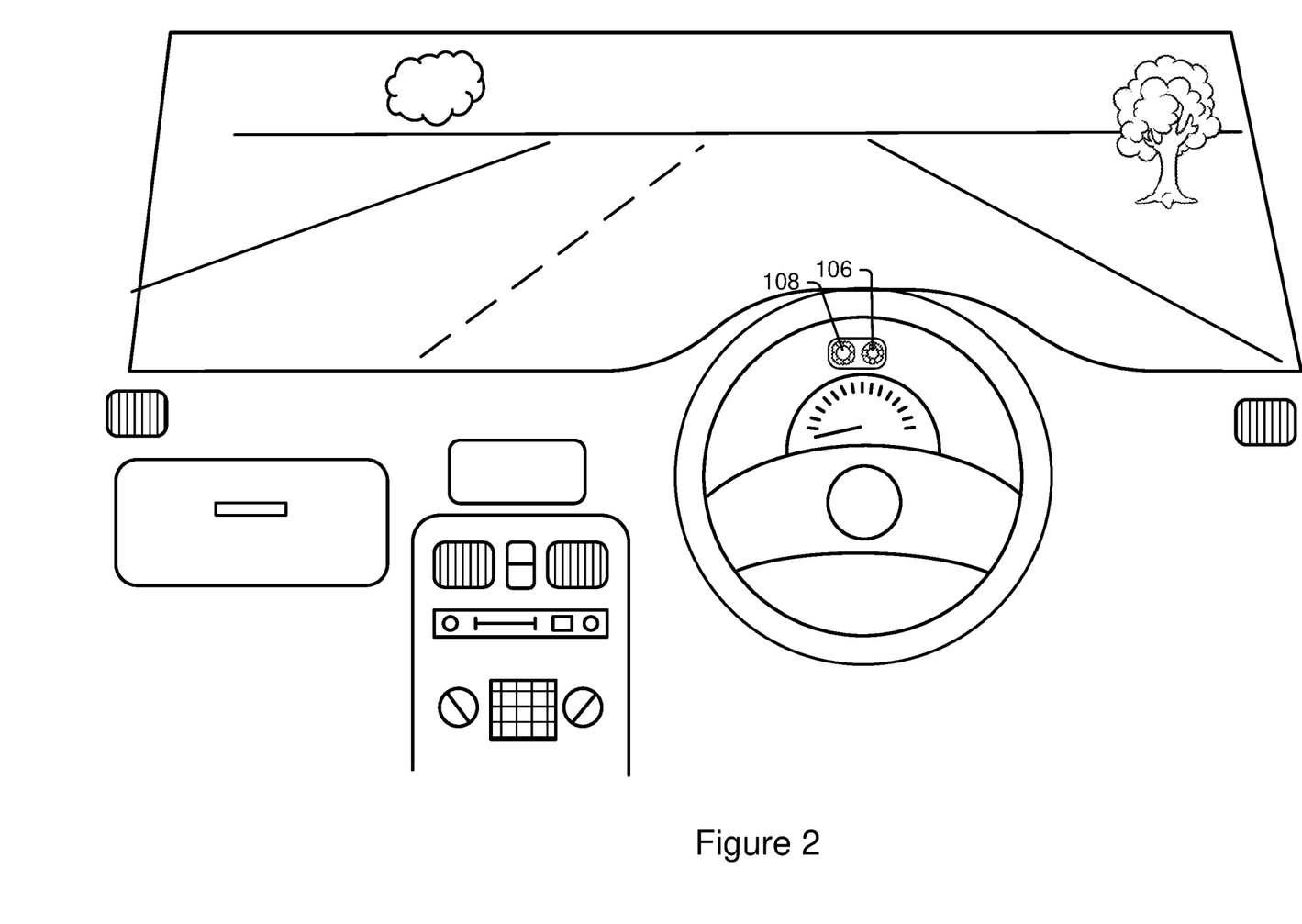
FIG. 2 is a perspective driver's view of the vehicle of FIG. 1 illustrating the driver monitoring system of FIG. 1 and forward field of view of the driver.

Referring initially to FIGS. 1 and 2, there is illustrated a driver monitoring system 100 for monitoring and tracking the head and eyes of a driver 102 of a vehicle 104. System 100 includes an infrared camera 106 that is positioned on or in the vehicle dash instrument display to capture images of the eyes of driver 102 at wavelengths in the infrared range. An infrared light source in the form of a vertical-cavity surface emitting (VCSEL) laser 108 is disposed adjacent camera 106 to generate an input light beam and project the light beam along a path towards driver 102. VCSEL 108 is controlled to selectively illuminate the driver's face with infrared radiation during image capture by camera 106 in a manner described below. In some embodiments, VCSEL 108 may be replaced with other types of light sources such as light emitting diodes (LEDs), directional filament lights or fluorescent lights.

Operation in the infrared range reduces distraction to the driver. In some embodiments, two spaced apart VCSELs are alternatively activated or "strobed" to provide for illumination at different angles which allows for reduction of glare effects as described in PCT Patent Application Publication WO 2016/131075 entitled "Glare Reduction" and assigned to Seeing Machines Limited. However, as will be described below, the present invention is able to reduce glare present in images without the need for two or more separate light sources.

Camera 106 may be a CCD or CMOS based two dimensional camera having an image sensor comprising an array of photosensitive pixels that are capable of sensing electromagnetic radiation in the infrared range. In other embodiments, camera 106 may be replaced by a single two dimensional camera having depth sensing capability or a pair of like cameras operating in a stereo configuration and calibrated to extract depth. Although camera 106 is preferably configured to image in the infrared wavelength range, it will be appreciated that, in alternative embodiments, camera 106 may image in the visible range.

Figure 3:
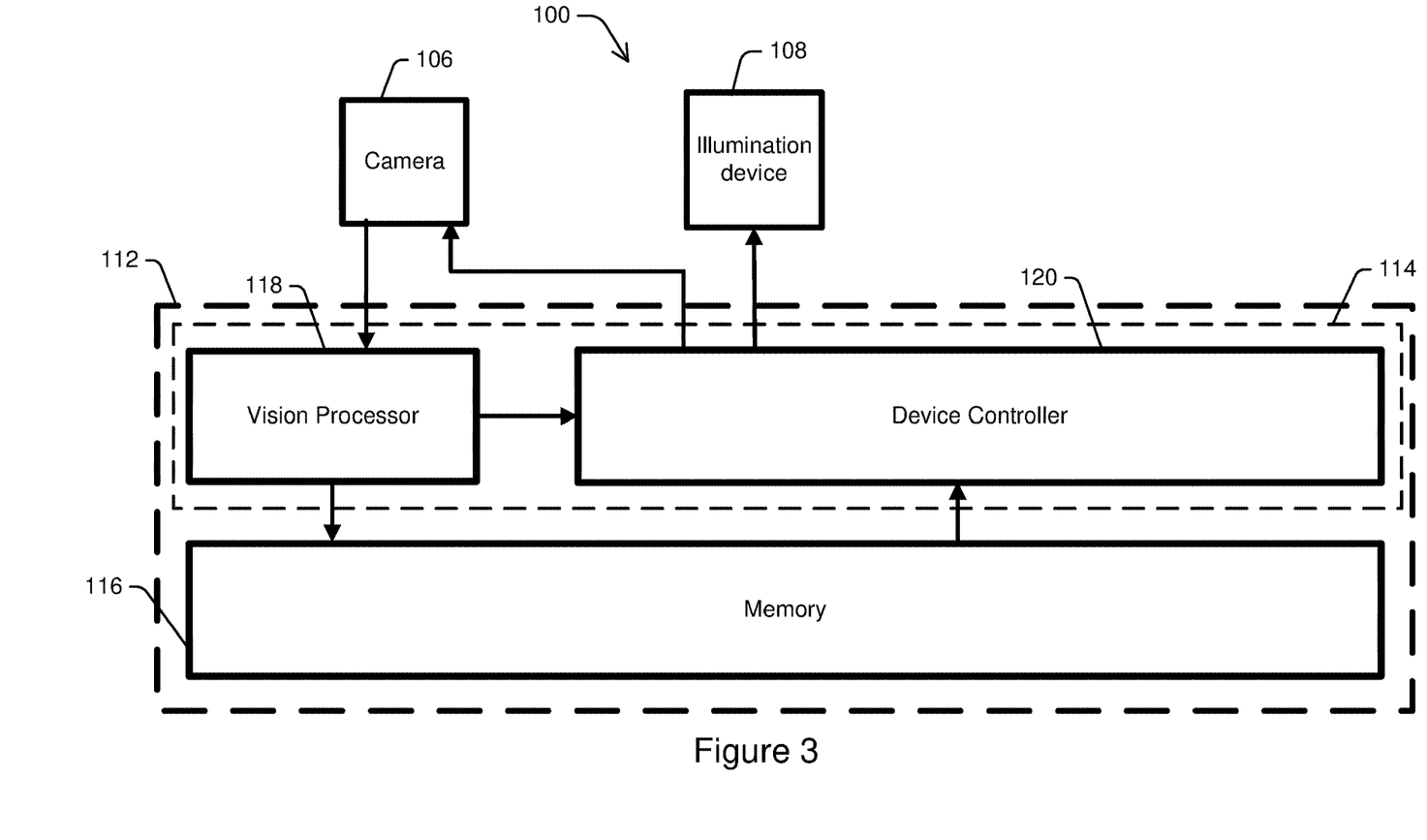
FIG. 3 is schematic functional diagram of the driver monitoring system of FIGS. 1 and 2.

As shown in FIG. 3, a system controller 112 acts as the central processor for system 100 and is configured to perform a number of functions as described below. Controller 112 is located within the dash of vehicle 5 and may be connected to or integral with the vehicle on-board computer. In another embodiment, controller 112 may be located within a housing or module together with camera 106 and VCSEL 108. The housing or module is able to be sold as an after-market product, mounted to a vehicle dash and subsequently calibrated for use in that vehicle. In further embodiments, such as flight simulators, controller 112 may be an external computer or unit such as a personal computer.

In other embodiments, the driver monitoring system 100 may include one or more cameras and light sources mounted in other locations suitable to capture images of the head or facial features of a driver, subject and/or passenger in a vehicle. By way of example, cameras and light sources may be located on a steering column, rearview mirror, center console or driver's side A-pillar of the vehicle. Also, in some embodiments, more than two light sources may be employed in the system. Controller 112 may be implemented as any form of computer processing device or portion of a device that processes electronic data, e.g., from registers and/or memory to transform that electronic data into other electronic data that, e.g., may be stored in registers and/or memory. As illustrated in FIG. 2, controller 112 includes a microprocessor 114, executing code stored in memory 116, such as random access memory (RAM), read-only memory (ROM), electrically erasable programmable read-only memory (EEPROM), and other equivalent memory or storage systems as should be readily apparent to those skilled in the art.

Microprocessor 114 of controller 112 includes a vision processor 118 and a device controller 120. Vision processor 118 and device controller 120 represent functional elements which are performed by microprocessor 114. However, it will be appreciated that, in alternative embodiments, vision processor 118 and device controller 120 may be realized as separate hardware such as microprocessors in conjunction with custom or specialized circuitry.

Vision processor 118 is configured to process the captured images to perform the driver monitoring; for example to determine a three dimensional head pose and/or eye gaze position of the driver 102 within the monitoring environment. To achieve this, vision processor 118 utilizes one or more eye gaze determination algorithms. This may include, by way of example, the methodology described in U.S. Pat. No. 7,043,056 entitled "Facial Image Processing System" and assigned to Seeing Machines Pty Ltd. Vision processor 118 may also perform various other functions including determining attributes of the driver 102 such as eye closure, blink rate and tracking the driver's head motion to detect driver attention, sleepiness or other issues that may interfere with the driver safely operating the vehicle. The raw image data, gaze position data and other data obtained by vision processor 118 is stored in memory 116.

Device controller 120 is configured to control camera 106 and to selectively actuate VCSEL 108 in sync with the exposure time of camera 106. VCSEL 108 is preferably electrically connected to device controller 120 but may also be controlled wirelessly by controller 120 through wireless communication such as Bluetooth™ or WiFi™ communication.

During operation of vehicle 104, device controller 120 activates camera 106 to capture images of the face of driver 102 in a video sequence. VCSEL 108 is activated and deactivated in synchronization with consecutive image frames captured by camera 106 to illuminate the driver during image capture. Camera 106 includes an image sensor that is configured to image reflected light being light from the output light beam that is reflected from the driver's face. Working in conjunction, device controller 120 and vision processor 118 provide for capturing and processing images of the driver to obtain driver state information such as drowsiness, attention and gaze position during an ordinary operation of vehicle 104.

System 100 operates in varying lighting conditions, including bright and dark conditions, and when the driver is wearing dark or reflective sunglasses.

Figure 4:
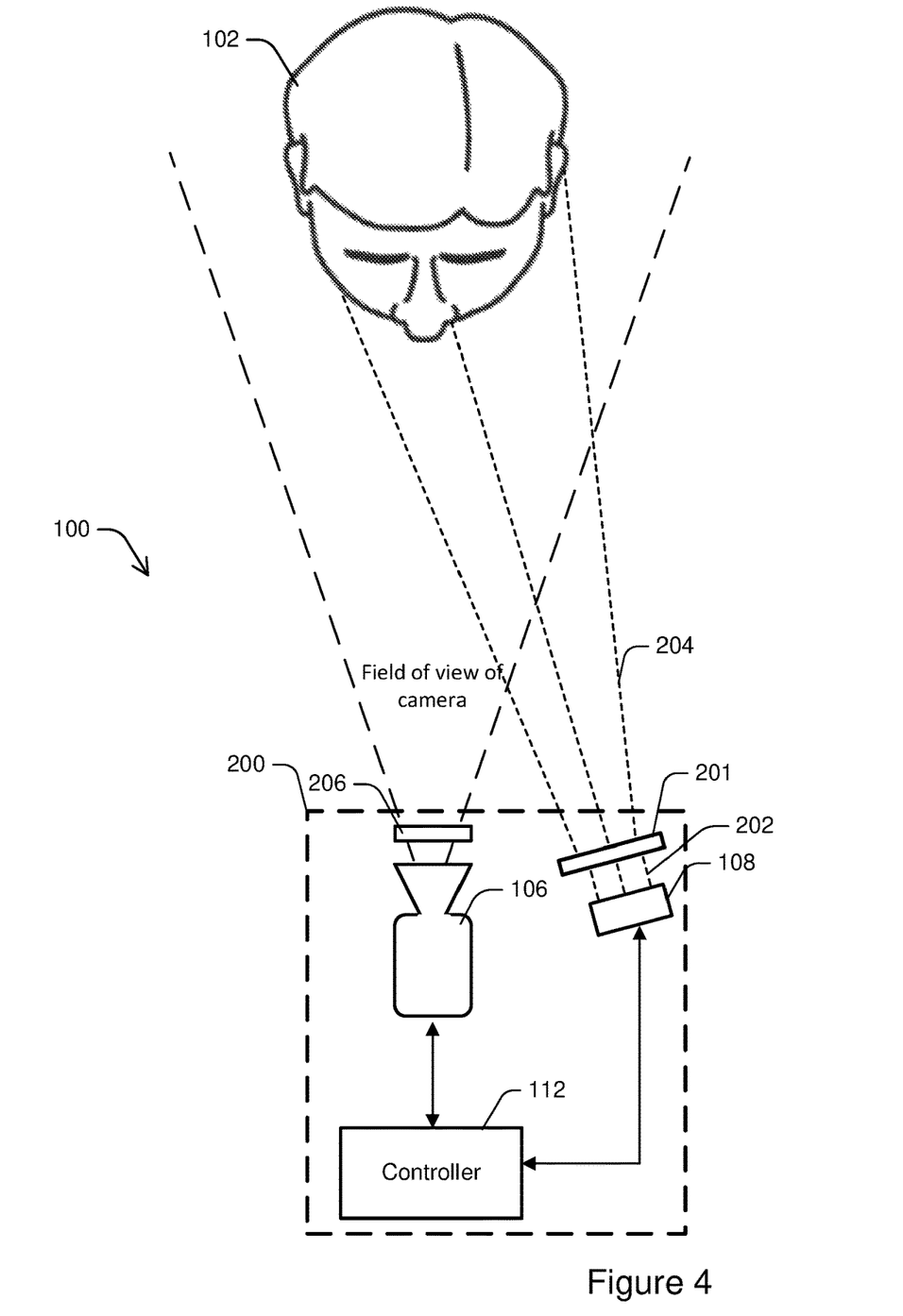
FIG. 4 is a schematic plan view of the driver monitoring system of FIGS. 1 to 3.
Figure 5:
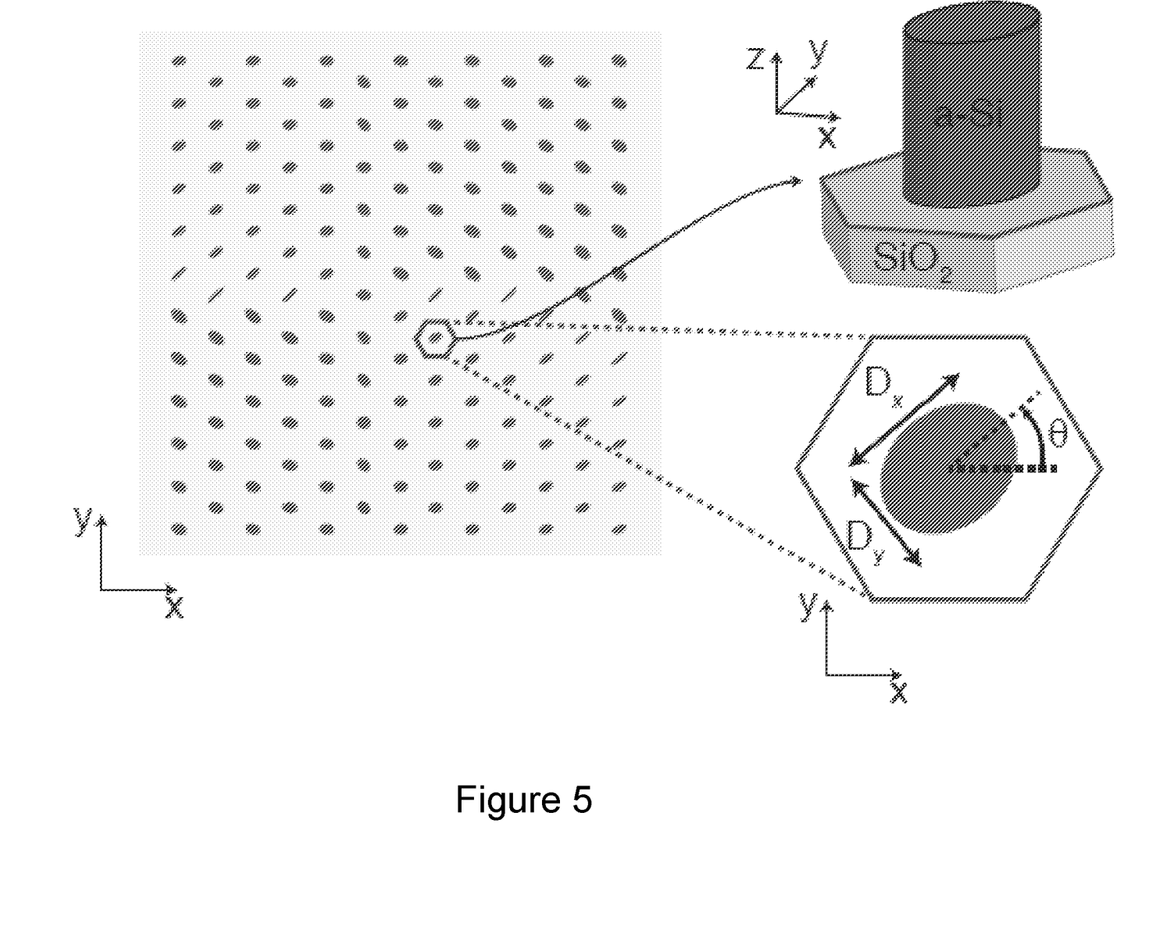
FIG. 5 is a schematic illustration of an example dielectric metasurface.

Referring now to FIG. 4, a schematic plan view of system 100 is illustrated, which more clearly emphasizes aspects of the present invention. In particular, system 100 includes an imaging system 200 including a substantially planar dielectric metasurface 201 disposed adjacent VCSEL 108. Metasurface 201 is positioned within the path of an input light beam 202 generated by VCSEL 108. Metasurface has a two dimensional array of surface elements configured to impose predetermined phase, polarization and/or intensity changes to the input light beam to generate an output light beam 204 for illuminating driver 102. A schematic illustration of an example metasurface is illustrated in FIG. 5. This figure is an extract from A Arbabi et al., "Dielectric metasurfaces for complete control of phase and polarization with subwavelength spatial resolution and high transmission", Nature Nanotechnology 10, 937-943 (2015) (hereinafter "Arbabi").

The function and operation of metasurface 201 is described in more detail below. Although illustrated as a transmissive device, in other embodiments, metasurface 201 may be implemented as a reflective device.

Overview of Dielectric Metasurfaces

Optical or dielectric metasurfaces are sub-wavelength patterned thin layer materials which interact strongly with incident light. Typical metasurfaces include one and two-dimensional arrays of surface profiled elements (called "pixels") with subwavelength periodicity.

Dielectric metasurfaces can be manufactured by conventional complementary metal-oxide-semiconductor (CMOS) fabrication techniques. These metasurfaces can be fabricated from substrate materials including silicon and other high refractive index materials.

Exemplary dielectric metasurface structures designed to provide complete phase and polarization control of light are described in Arbabi referenced above. In these designs, the surface is divided into hexagonal pixel regions and the pixel structures comprise elliptical posts formed of amorphous silicon and which have varying thickness and orientation. The elliptical posts project perpendicularly from a planar surface substrate of fused silica material. This arrangement is illustrated in FIG. 5.

The sub-wavelength pixel structures are designed to locally modify the phase, polarization and amplitude of an incident light beam, and can operate in transmission or reflection modes. An appropriately designed metasurface is able to achieve complete control over polarization and phase if it can generate any desired physically admissible spatially varying polarization and phase distributions from an input beam with arbitrary polarization and phase distributions. In optical terms, this requires each sub-wavelength pixel structure to be designed to implement any unitary and symmetric Jones matrix. Such a requirement can be achieved using a dielectric metasurface if the angle ($\phi_x$, $\phi_y$) between one of the principal axes of the material and the x axis can be chosen freely. This is possible by selection of the pixel diameters $D_x$ and $D_y$, and an in-plane rotation angle θ. For systems operating in the near infrared range, the dimensions of the sub-wavelength pixel elements are typically greater than 1 nm and less than 1 mm. In the visible range, the dimensions of the pixel elements may be even smaller in scale.

In the example of Arbabi, the elliptical cross section of the posts (which act as waveguides) leads to different effective refractive indices of waveguide modes polarized along the two ellipse diameters. As a result, each of the posts imposes a polarization dependent phase shift to the transmitted light and modifies both its phase and polarization.

Due to symmetry, a normally incident optical wave linearly polarized along one of the ellipse axes does not change polarization and only acquires phase as it passes though the array. The phase shifts imposed by the array to the x and y-polarized waves (i.e. $\phi_x$ and $\phi_y$) are functions of the elliptical post diameters $D_x$ and $D_y$. Exemplary dimensions of the elliptical posts are ~715 nm tall with diameters ranging from 65 nm to 455 nm. Therefore, the array behaves as a 2D material with adjustable birefringence whose principal axes are along x and y directions.

The principal axes of the birefringent array shown in FIG. 2a can be rotated by rotating the entire array or, with good approximation, by rotating all posts around their axes.

Therefore, in the example of Arbabi, any desired spatially varying polarization and phase profiles can be generated by sampling the incident wavefront with a sub-wavelength lattice, and placing elliptical posts with proper dimensions and rotation angles at the lattice sites to impart the required phase and polarization change on the transmitted light. Similar control can be implemented in other dielectric metasurface designs.

To avoid diffraction of light into non-zero diffraction orders, and to achieve high polarization and phase gradients required for implementation of optical components such as lenses with high numerical apertures, it is important that each pixel has a lateral dimension smaller than a wavelength.

For the purpose of fabrication of dielectric metasurfaces, an appropriate surface design is required. This can be obtained by inputting an input optical beam profile and a desired output optical beam profile to optical simulation software. The software can determine a corresponding Jones matrix field which would perform the beam profile transformation. This Jones matrix field can be used to calculate a corresponding two dimensional array of pixel elements which can be fabricated from a substrate using fabrication techniques such as CMOS.

The significance of a dielectric metasurface is that the function of a range of different conventional optical elements can be implemented on a single flat optical element. The fine control of local phase across the entire beam wavefront allows for manipulation of the optical beam power to focus, reshape or redirect the beam. Example conventional optical elements that can be functionally realized using dielectric metasurfaces include lenses, polarizers, beam splitters, wave retarders, spatial phase modulators and optical filters.

System Operation

In various embodiments, the surface elements of metasurface 201 are designed so as to manipulate one or each of the phase, polarization and intensity of the input light beam wavefront. This allows for generating several advantageous effects as described below, which improve the performance of the driver monitoring system.

Depth Estimation Using Structured Light

Figure 6:
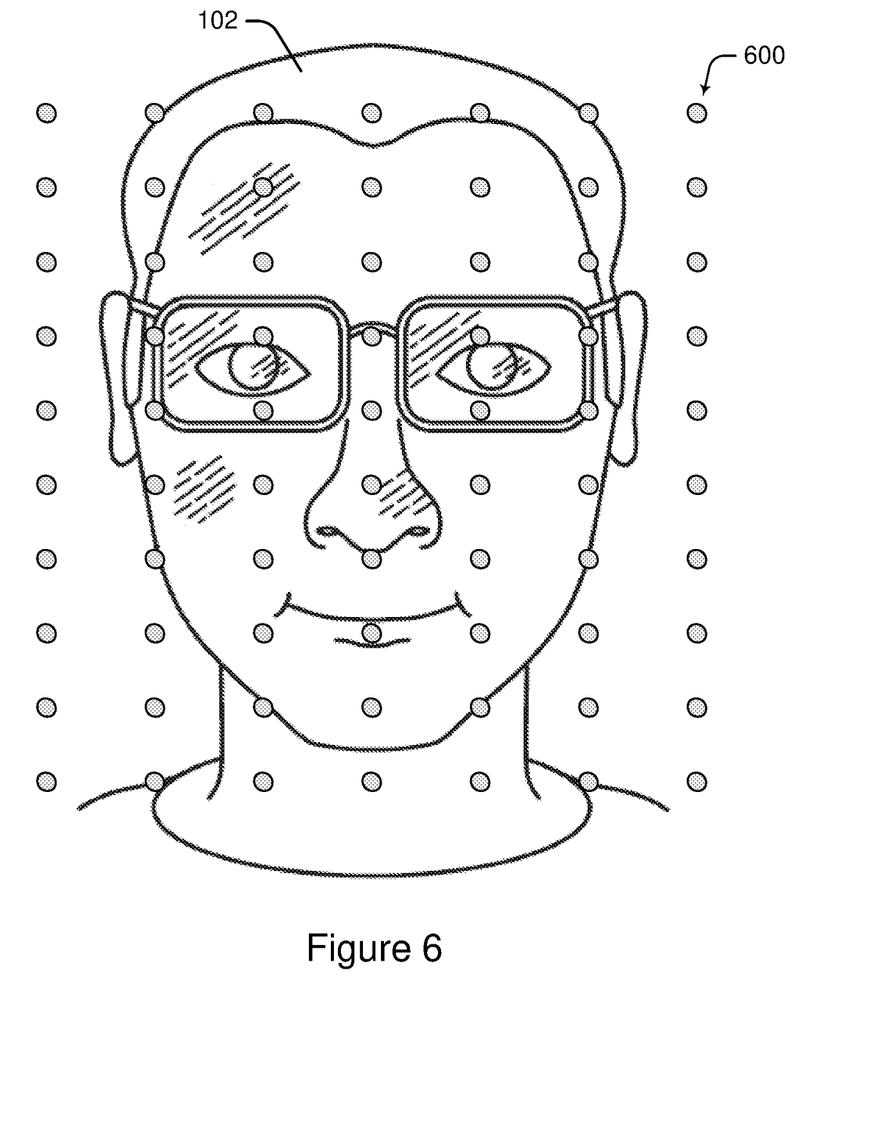
FIG. 6 is a front view of a driver's face illustrating a projection of an array of dots as structured light onto the face.

In some embodiments, the array of surface elements of metasurface 201 are designed to have phase properties to produce a two dimensional structured light pattern across the output light beam. This structured light pattern is incident onto the face of driver 102 and detected at camera 106. By way of example, as illustrated in FIG. 6, the structured light pattern may include an array of dots 600 disposed at known locations across the output light beam. Here, the dots are defined as regions of lower contrast than the surrounding output light beam. The contrast ratio of the dots to the surrounding output light beam is preferably in the range of 70% to 90% and may be 70%, 75%, 80%, 85%, 90% or any number in between. In some embodiments, the difference in contrast is higher than 90% but less than 100%, for example, 95%.

The generation of a structured light pattern such as an array of dots is possible by manufacturing a metasurface to have local phase variations which define a diffractive surface. The diffractive effects act to steer the light in the beam to form a wavefront having small local regions of lower intensity where the dots are to be formed. As described above, the local phase variations are performed by manufacturing surface elements of different thickness at different locations across the metasurface 201.

In operation, the driver 102 is illuminated with the output light beam 204 which projects the array of dots 600 across the driver's face. Depending on the depth of the feature from which the dots are reflected, the array of dots will be deformed upon imaging by camera 106. If the precise position of the dots has been accurately calibrated beforehand, the degree of deformation of the array can be used by processor 118 to extract depth information about the driver's face. Thus, in combination with the two-dimensional lateral position of the facial features, the depth information can provide a full three dimensional identification of facial features for performing facial feature tracking such as head pose and eye gaze.

It will be appreciated that a number of different structured light patterns can be used to perform depth estimation. Another example structure is a grid of lines. The dot structure with small contrast changes is advantageous as it minimizes the noise added to the image and therefore reduces the impact on accuracy of facial feature tracking. Although illustrated as an ordered array of dots, it will be appreciated that the array need not be ordered. The pattern of dots may be pseudorandom as long as the non-deformed position of the dots in the images can be accurately calibrated before depth estimation. Calibration can be performed by projecting the structured light pattern onto a known reference surface such as a planar surface and measuring the imaged dot position.

Glare Reduction Through Polarization

Figure 7:
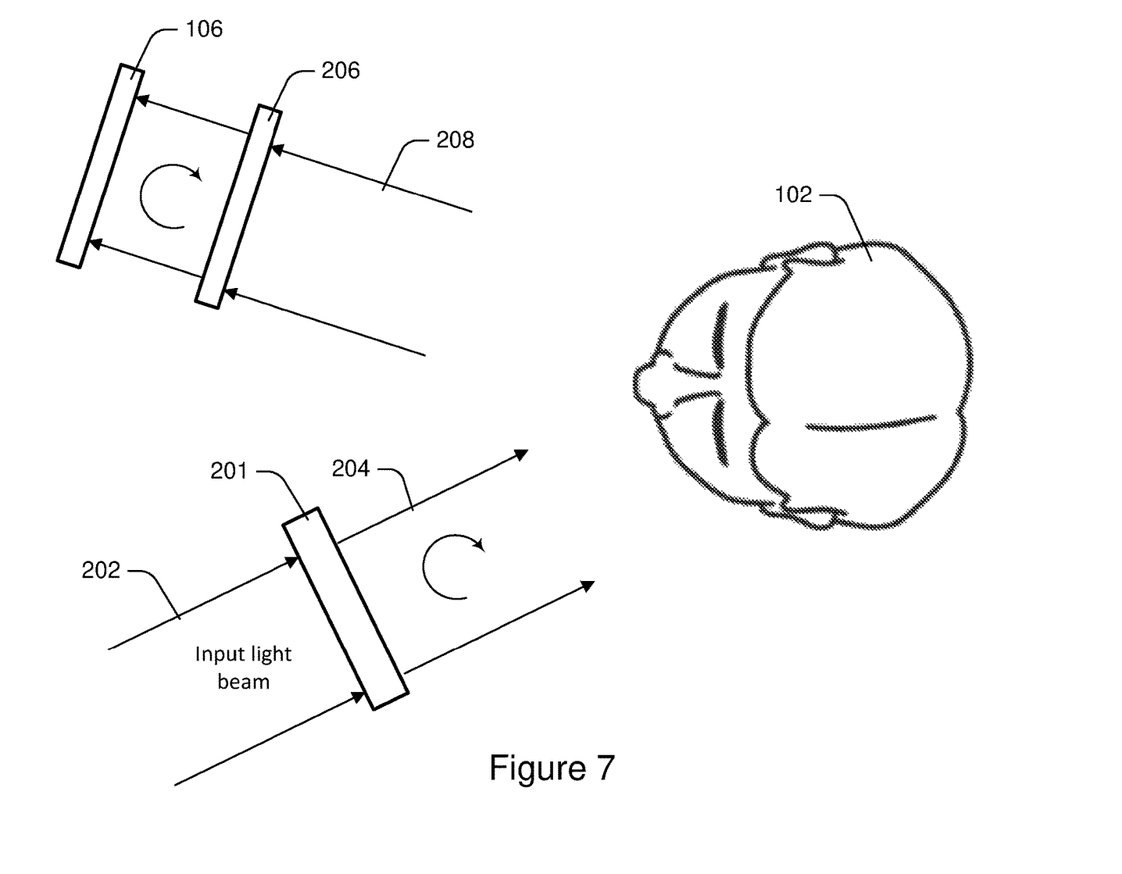
FIG. 7 is sectional view of the driver monitoring system of FIGS. 1 to 4 illustrating the polarization of the input and reflected light beams.

In some embodiments, the array of surface elements of metasurface 201 is designed to have polarizing properties to polarize the output light beam into a left hand or right hand circular polarization state. By way of example, as illustrated in FIG. 7, metasurface 201 is designed to circularly polarize input light beam 202 to generate output light beam 204 having right hand circular polarized light. System 100 also includes a polarization filter 206 disposed proximal to camera 106. Filter 206 is configured to transmit only reflected or backscattered light 208 having right hand circular polarized light to the image sensor of camera 106. Filter 206 rejects light having all other polarization states.

The circular polarization of an input light source is possible by manufacturing a metasurface to have local polarization variations which perform an overall polarization of the beam. As described above, the local polarization variations can be performed by manufacturing surface elements of different elliptical orientation at different locations across the metasurface 201 to manipulate the electric field at a sub-wavelength scale.

In operation, the right hand circular polarized light of beam 204 is projected onto the face of driver 102. The light returned from the driver comprises specular and diffuse (or backscattered) reflections depending on the surface from which the light is reflected. It is known that specular reflections off highly reflective surfaces such as corneas, shiny skin and glasses produce glare in the presence of bright light conditions (including the light source itself). This is illustrated in the top panel of FIG. 8. These reflections often represent noise in systems such as driver monitoring systems as light from outside the scene can be received at the image sensor.

Upon specular reflection from a surface at normal incidence, electromagnetic waves reverse their electric fields. For linearly polarized light, this results in a reversal of the linear polarity. For circular polarized light, the handedness of the polarization is reversed upon reflection. Thus, a right handed circular polarized light beam is reflected as left hand circular polarized light and vice versa. Light reflected more diffusely off surfaces such as the driver's skin are reflected without any great change in the polarization state.

Figure 8:
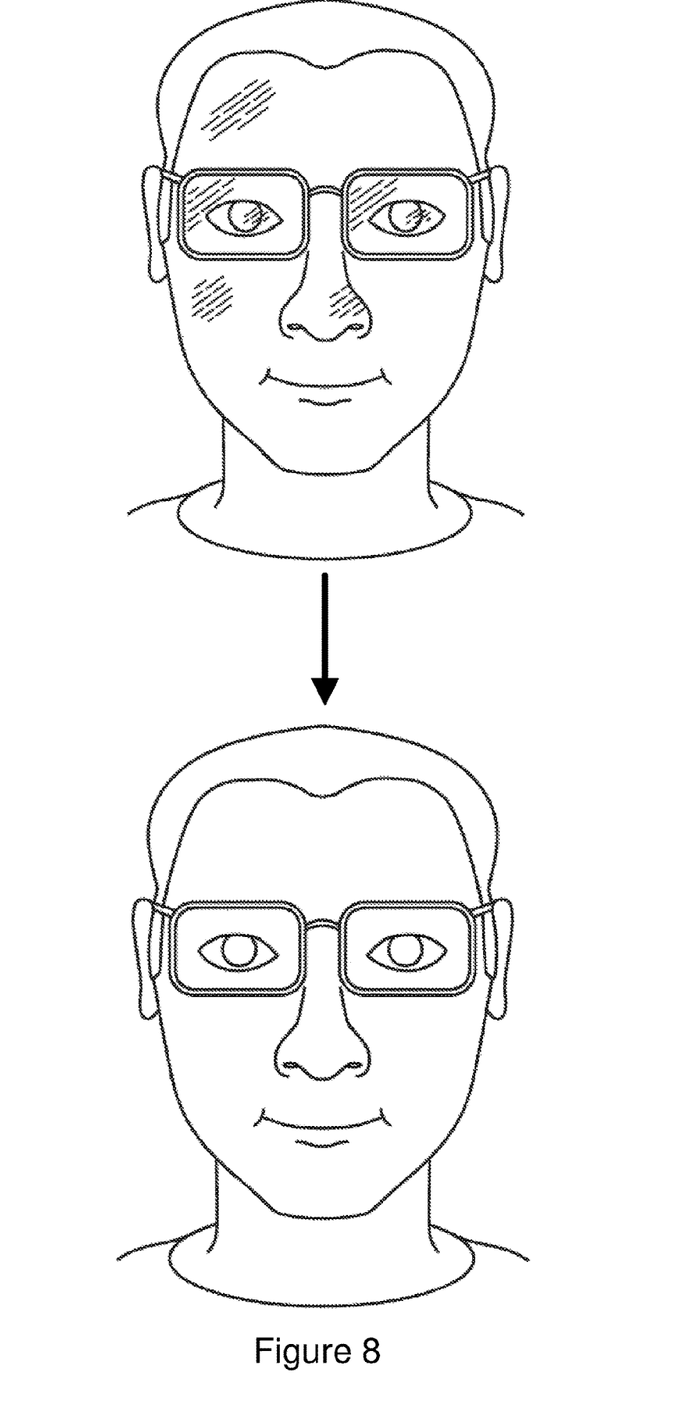
FIG. 8 is a before and after front view of a driver's face illustrating the removal of glare.

The reflected light 208 therefore comprises light of various polarization states. Upon incidence onto polarization filter 206, reflected light still having a right handed circular polarization state is transmitted through filter 206 and received at the image sensor of camera 106. All other polarization states are absorbed by filter 206. This transmission and receiving of circular polarized light advantageously allows for the filtering of noisy specular reflections from glare, thereby improving the quality of the image to be processed by processor 118. This glare reduction is illustrated in FIG. 8.

In some embodiments, the polarization filter 206 is constructed in a conventional manner using a quarter wave plate and a linear polarizer in combination. In other embodiments, polarization filter 206 includes a dielectric metasurface having a two dimensional array of surface elements configured to absorb the first circular polarized light component and pass the remaining reflected light.

Although illustrated as transmitting and receiving right hand circular polarized light, it will be appreciated that an equivalent setup can be created to transmit and receive left hand circular polarized light to achieve the same glare reduction effects.

Although the polarization filter 206 is illustrated as a transmissive filter, it will be appreciated that, in other embodiments, filter 206 can be realized as a reflective filter.
Beam Shaping In some embodiments, the array of surface elements of metasurface 201 is designed to have phase properties to shape the output light beam to substantially match a field of view of the image sensor of camera 106. Image sensors operating in the NIR range are sensitive to only a narrowband range of light. Therefore, it is important to maximize the amount of light that is received at the image sensor.

Figure 9:
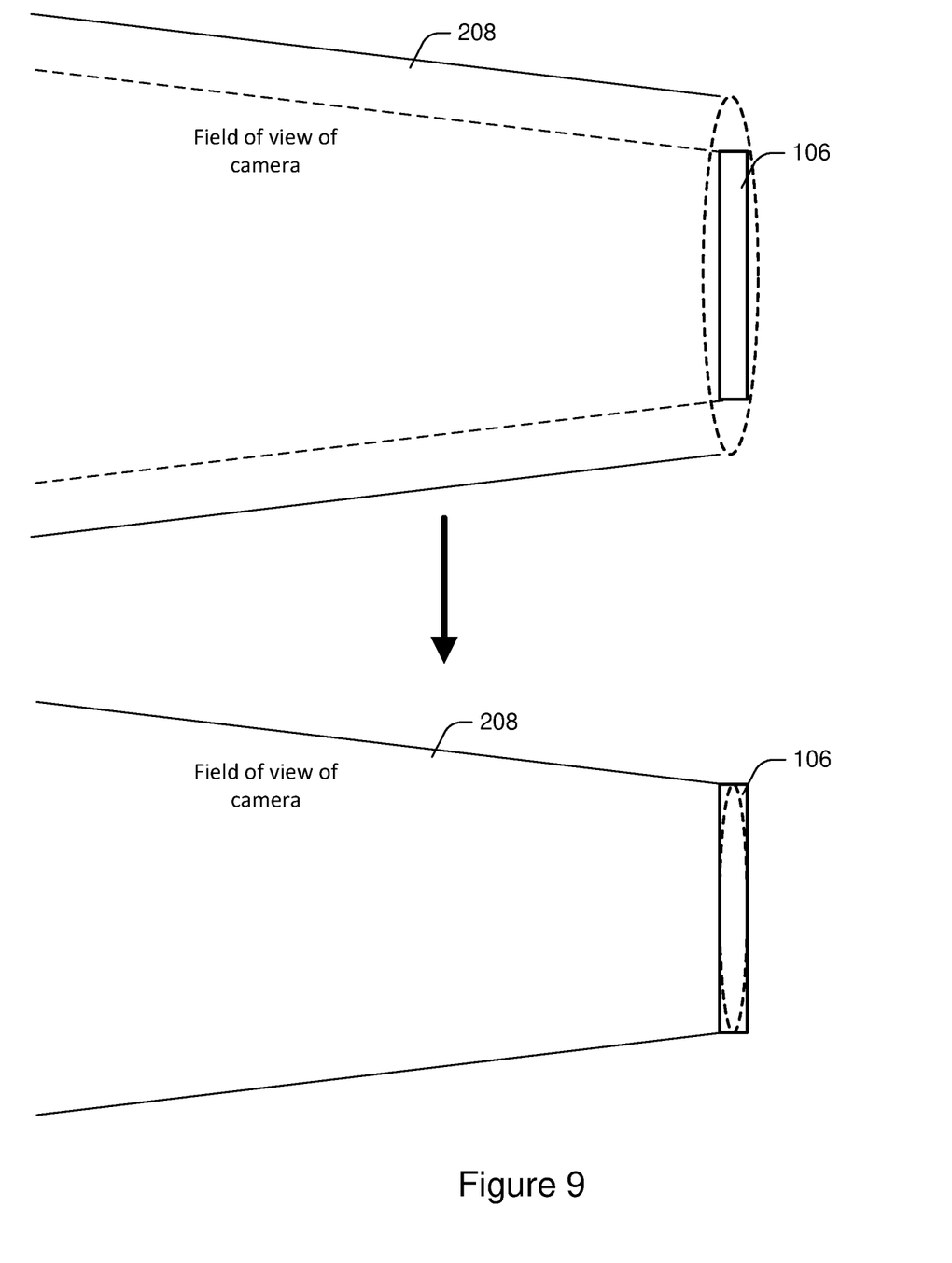
FIG. 9 is a before and after side view of reflected light incident onto an image sensor of a camera.

The shaping of a beam wavefront is possible by manufacturing a metasurface to have local phase variations which define an overall lens to focus or defocus the beam. The diffractive effects act to simulate the spatially varying thickness of a lens to shape the beam into a more focused or defocused waist. In the present application, metasurface 201 is designed to focus the waist of input light beam 202 such that the reflected light 208 substantially matches the field of view of camera 106. This is illustrated in FIG. 9. As described above, the local phase variations which perform this lensing effect can be achieved by manufacturing surface elements of different thickness at different locations across the metasurface 201.

Although described as different effects, it will be appreciated that a single dielectric metasurface can be designed which simultaneously performs the structured light, polarization and beam shaping effects described above.

CONCLUSIONS

It will be appreciated that the embodiments described above provide advantages in improving the image quality of images captured in a driver monitoring system. Similar advantages can be realized in other imaging systems using the present invention.

The implementation of a dielectric metasurface into an imaging system has provides various advantageous effects. For example, the invention allows for achieving polarization, beam shaping and structured light on a single thin wafer metasurface element. This removes the need for a number of bulk optical elements, which add to system size, cost and overall optical loss.

Advantages of using dielectric metasurfaces can include:
Near unity transmittance (T>99%);
Little reflection losses;
Little absorption losses in the near infrared region; and
Little polarization conversion losses.

INTERPRETATION

It will be understood by one skilled in the art that the frequency and wavelength of a laser beam are connected by the equation:

Speed of light=wavelength*frequency.

As a consequence, when reference is made to frequency shifting, frequency converting, frequency broadening, different frequencies and similar terms, these are interchangeable with the corresponding terms wavelength shifting, wavelength converting, wavelength broadening, different wavelengths and the like.

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

I claim:

1. An imaging system for imaging a subject, the imaging system including:
    a light source for generating an input light beam and projecting the input light beam along a path towards the subject;
    a dielectric metasurface positioned within the path of the input light beam, the metasurface having a two dimensional array of surface elements configured to impose predetermined phase changes to the input light beam to generate an output light beam for illuminating the subject, wherein the array of surface elements have polarizing properties to polarize the output light beam into a first polarization state corresponding to a left hand or right hand circular polarization; and
    an image sensor configured to image returned light being light from the output light beam that is reflected or backscattered from the subject; and
    a polarization filter disposed proximal to the image sensor, the polarization filter configured to direct reflected or backscattered light having the first polarization state to the image sensor and to reject light having other polarization states.

2. An imaging system according to claim 1 wherein the array of surface elements has phase properties to produce a two dimensional structured light pattern across the output light beam.

3. An imaging system according to claim 2 wherein the structured light pattern includes a plurality of dots disposed at known locations across the output light beam.

4. An imaging system according to claim 3 wherein the dots are defined as regions of lower contrast than the surrounding output light beam.

5. An imaging system according to claim 4 wherein the contrast ratio of the dots to the surrounding output light beam is in the range of 70% to 90%.

6. The imaging system according to claim 2 wherein the metasurface includes surface elements having different thickness at different locations across the metasurface.

7. An imaging system according to claim 1 wherein the polarization filter includes a dielectric metasurface having a two dimensional array of surface elements configured to pass the first circular polarized light component and absorb the remaining reflected light.

8. An imaging system according to claim 1 wherein the light source is a laser.

9. An imaging system according to claim 8 wherein the laser is a vertical-cavity surface emitting (VCSEL) laser.

10. An imaging system according to claim 1 configured for operation in a driver monitoring system for monitoring a vehicle driver.

11. An imaging system according to claim 1 configured for operation in a mobile device for imaging a user of the mobile device.

12. An imaging system according to claim 1 configured for operation in a LIDAR system.

13. An imaging system according to claim 1 configured for operation in a computer webcam for imaging a user of the computer.

14. The imaging system according to claim 1 wherein the metasurface includes surface elements providing local phase variations which perform a lensing effect to focus or defocus the beam.

15. The imaging system according to claim 1 wherein the array of surface elements have phase properties to shape the output light beam to substantially match a field of view of the image sensor.

16. An imaging system for imaging a scene, the imaging system including:
- a light source for generating an input light beam and projecting the input light beam along a path towards the scene;
- a dielectric metasurface positioned within the path of the input light beam, the metasurface having a two dimensional array of surface elements configured to circularly polarize the input light beam to generate an output light beam having a circular polarization state for illuminating the scene;
- a polarization filter configured to receive reflected light from the scene and to direct the reflected light having the circular polarization state to the image sensor and to reject light having all other polarization states; and
- an image sensor configured to image the reflected light to obtain images of the scene.

17. The imaging system according to claim 16, wherein the two dimensional array of surface elements are configured to produce a two dimensional structured light pattern including a plurality of structural features disposed at known locations across the beam to generate a structured output light beam for illuminating the subject in the scene, wherein the structural features are defined as regions of lower contrast than the surrounding output light beam;
- wherein the image sensor is configured to capture light from the structured output light beam that is reflected or backscattered from the subject; and
- wherein the processor is configured to process the captured light to estimate depth information about the scene from changes in the two dimensional structured light pattern.

18. The imaging system according to claim 17 wherein the structural features include dots disposed at known locations across the output light beam.

19. The imaging system according to claim 17 wherein the contrast ratio of the structural features to the surrounding output light beam is in the range of 70% to 90%.

20. The imaging system according to claim 16 wherein the dielectric metasurface includes surface elements of different elliptical orientation at different locations across the metasurface to manipulate the electric field at a sub-wavelength scale.

* * * * *